US010574339B2

(12) United States Patent
Chandra et al.

(10) Patent No.: US 10,574,339 B2
(45) Date of Patent: Feb. 25, 2020

(54) NETWORK ACCESS FROM AIRBORNE VEHICLE

(71) Applicant: Microsoft Technology Licensing, LLC, Redmond, WA (US)

(72) Inventors: Ranveer Chandra, Kirkland, WA (US); Eric J. Horvitz, Kirkland, WA (US); Ashish Kapoor, Redmond, WA (US); Talal Ahmad, Redmond, WA (US)

(73) Assignee: Microsoft Technology Licensing, LLC, Santa Clara, CA (US)

( * ) Notice: Subject to any disclaimer, the term of this patent is extended or adjusted under 35 U.S.C. 154(b) by 73 days.

(21) Appl. No.: 15/906,909

(22) Filed: Feb. 27, 2018

(65) Prior Publication Data

US 2019/0268064 A1 Aug. 29, 2019

(51) Int. Cl.
*H04B 7/185* (2006.01)
*H04B 17/318* (2015.01)
*H04B 7/155* (2006.01)

(52) U.S. Cl.
CPC ......... *H04B 7/18506* (2013.01); *H04B 7/155* (2013.01); *H04B 17/318* (2015.01)

(58) Field of Classification Search
CPC ... H04B 7/18506; H04B 7/155; H04B 17/318
See application file for complete search history.

(56) References Cited

U.S. PATENT DOCUMENTS

2015/0236778 A1 8/2015 Jalali
2015/0236779 A1 8/2015 Jalali
2016/0046387 A1 2/2016 Frolov et al.
(Continued)

FOREIGN PATENT DOCUMENTS

EP 3196670 A1 7/2017

OTHER PUBLICATIONS

"Flightaware", Retrieved From <<https://flightaware.com/commercial/flightxml/>>, Retrieved on: Jan. 19, 2018, 2 Pages.
(Continued)

*Primary Examiner* — Will W Lin
(74) *Attorney, Agent, or Firm* — Schwegman Lundberg & Woessner, P.A.

(57) ABSTRACT

A device can include control channel receiver circuitry to receive airborne vehicle control channel packets, decode circuitry to determine contents of the airborne vehicle control channel packets, transceiver circuitry to provide uplink to and receive downlink data from an airborne vehicle, processing circuitry, and a program for execution by the processing circuitry to perform operations comprising determining, based on data from the receiver circuitry, a received signal strength (RSS) of a signal from each of a plurality of airborne vehicles, determining, for each of the airborne vehicles and based on decoded data from the decode circuitry, a length of time the airborne vehicle will be within transmission range of the transceiver circuitry, determining, for each of the airborne vehicles and based on the determined RSS, determined length of time, and a determined bit-rate, an association metric, and causing association with the airborne vehicle associated with the greatest association metric.

20 Claims, 6 Drawing Sheets

(56) References Cited

U.S. PATENT DOCUMENTS

| | | | | |
|---|---|---|---|---|
| 2017/0257779 | A1 | 9/2017 | Zerick et al. | |
| 2018/0247472 | A1* | 8/2018 | Odejerte, Jr. | G01S 5/0284 |
| 2019/0116556 | A1* | 4/2019 | Golsch | H04B 17/318 |

OTHER PUBLICATIONS

"Gogo", Retrieved From <<https://www.gogoair.com/>>, Retrieved on: Jan. 19, 2018, 3 Pages.

Goldstein, Phil, "Gogo gets FAA approval for 70 Mbps in-flight Wi-Fi service, but most rollouts coming in 2016", Retrieved From <<https://www.fiercewireless.com/wireless/gogo-gets-faa-approval-for-70-mbps-flight-wi-fi-service-but-most-rollouts-coming-2016>>, Aug. 25, 2015, 2 Pages.

"OpenBts", Retrieved From <<http://openbts.org/>>, Retrieved on: Jan. 19, 2018, 1 Page.

"routehappy 2017 wi-fi report.", Retrieved From <<https://www.routehappy.com/insights/wi-fi/2017>>, Retrieved on: Jan. 19, 2018, 7 Pages.

"JetBlue—Wi-Fi", Retrieved From <<https://www.jetblue.com/flying-on-jetblue/wifi/>>, Retrieved on: Jan. 19, 2018, 5 Pages.

Ahmad, et al., "Solar vs diesel: where to draw the line for cell towers?", In Proceedings of the Seventh International Conference on Information and Communication Technologies and Development, May 15, 2015, 11 Pages.

Chen, et al., "A 1-Watt Ku-Band Power Amplifier in SiGe with 37.5% PAE", In Proceedings of IEEE Radio Frequency Integrated Circuits Symposium, May 22, 2016, pp. 324-325.

Chen, Jesse Thomas, "Mimo enhancements for air-to-ground wireless communications", In Doctoral Dissertation of University of California, Jan. 1, 2014, 128 Pages.

Chen, et al., "Mimo performance evaluation for airborne wireless communication systems", In Proceedings of IEEE Military Communications Conference, Nov. 7, 2011, pp. 1827-1832.

Cheng, et al., "Performance Measurement of 802.11a Wireless Links from UAV to Ground Nodes with Various Antenna Orientations", In Proceedings of 15th International Conference on Computer Communications and Networks, Oct. 9, 2006, pp. 303-308.

Costin, et al., "Ghost in the Air(Traffic): On insecurity of ADS-B protocol and practical attacks on ADS-B devices", In Publication of Black Hat, Jul. 2012, 9 Pages.

"OsmoBTS", Retrieved From <<https://projects.osmocom.org/projects/osmobts>>, 2006, 1 Page.

Ferdman, Roberto A., "4.4 billion people around the world still don't have Internet. Here's where they live", Retrieved From <21 https://www.washingtonpost.com/news/wonk/wp/2014/10/02/4-4-billion-people-around-the-world-still-dont-have-internet-heres-where-they-live/?utm_term=.fb35420aeb08>>, Oct. 2, 2014, 2 Pages.

Heimerl, et al., "Local, sustainable, small-scale cellular networks", In Proceedings of the Sixth International Conference on Information and Communication Technologies and Development: Full Papers, vol. 1, Dec. 7, 2013, pp. 2-12.

Hoffman, et al.,"Traveling salesman problem", In Proceedings of Encyclopedia of Operations Research and Management Science, 2013, 9 Pages.

Iyengar, et al., "Concurrent multipath transfer using sctp multihoming over independent end-to-end paths", In Journal of IEEE/ACM Transactions on Networking, vol. 14, Issue 5, Oct. 2006, pp. 951-964.

Kapoor, et al., "Airplanes aloft as a sensor network for wind forecasting", In Proceedings of the 13th International Symposium on Information Processing in Sensor Networks, Apr. 15, 2014, pp. 25-34.

Kaur, et al., "Throughput analysis for opportunistic spectrum access among unlicensed device", In Proceedings of National Conference on Communications, Feb. 2012, 5 Pages.

Kung, et al., "Measuring receiver diversity on a low-altitude uav in a ground-to-air wireless mesh network", In Proceedings of IEEE Globecom Workshop on Wireless Networking for Unmanned Aerial Vehicles, Dec. 6, 2010, pp. 1799-1804.

Kunisch, et al., "Wideband time-variant air-to-ground radio channel measurements at 5 ghz", In Proceedings of the 5th European Conference on Antennas and Propagation, Apr. 11, 2011, pp. 1386-1390.

Matolak, David W., "Air-ground channels & models: Comprehensive review and considerations for unmanned aircraft systems", In Proceedings of IEEE Aerospace Conference, Mar. 3, 2012, pp. 1-17.

McCallie, et al., "Security analysis of the ads-b implementation in the next generation air transportation system", In International Journal of Critical Infrastructure Protection, vol. 4, Issue 2, Aug. 2011.

Mueller, Milton, "Universal service and the telecommunications act: myth made law", In Journal of Communication of the ACM, vol. 40, Issue 3, Mar. 1997, pp. 39-47.

Newhall, et al., "Wideband air-to-ground radio channel measurements using an antenna array at 2 ghz for low-altitude operations", In Proceedings of IEEE Military Communications Conference, Oct. 13, 2003, pp. 1422-1427.

Patra, et al., "Wildnet: Design and implementation of high performance wi-fi based long distance networks", In Proceedings of 4th Symposium on Networked Systems Design and Implementation, vol. 1, No. 1, Apr. 11, 2007, pp. 1-14.

Purton, et al., "Identification of ads-b system vulnerabilities and threats", In Proceedings of Australasian Transport Research Forum, Sep. 29, 2010, pp. 1-16.

Rice, et al., "Wideband channel model for aeronautical telemetry", In Journal of IEEE Transactions on Aerospace and Electronic Systems, vol. 40, No. 1, Jan. 2004, pp. 57-69.

Roberts, et al., "Connecting africa using the tv white spaces: From research to real world deployments", In Proceedings of IEEE International Workshop on Local and Metropolitan Area Networks, Apr. 22, 2015, 6 Pages.

Strohmeier, et al., "Realities and challenges of nextgen air traffic management: the case of ADS-B", In Journal of IEEE Communications Magazine, vol. 52, Issue 5, May 2014, pp. 111-118.

Thanki, Richard, "The Economic Significance of Licence-Exempt Spectrum to the Future of the Internet", In White Paper, Jun. 2012, pp. 1-115.

Xia, et al., "Virtual wi-fi: bring virtualization from wired to wireless", In Proceedings of ACM SIGPLAN Notices, vol. 46, Mar. 9, 2011, 12 Pages.

Ahmad, et al., "Wi-Fly: Widespread Opportunistic Connectivity via Commercial Air Transport", In Proceedings of the 16th ACM Workshop on Hot Topics in Networks, Nov. 30, 2017, 7 Pages.

Fialcowitz, et al., "Row 44, Inc.", Retrieved From <<https://in.linkedin.com/company/row-44-inc.>>, Retrieved on: Jan. 19, 2018, 1 Page.

"International Search Report and Written Opinion Issued in PCT Application No. PCT/US2019/018847", dated Aug. 14, 2019, 16 Pages.

* cited by examiner

NETWORK ACCESS FROM AIRBORNE VEHICLE

BACKGROUND

It is estimated that 4.4 billion people do not have Internet connectivity. Most of the world's offline population (estimated at about 64 percent of the offline population) live in impoverished rural settings, where poor electric power, communications infrastructure, and lack of hardware for base stations and end-user devices impede Internet adoption. It is estimated that more than 80 percent of people who are currently disconnected from the Internet are younger than 55 years old, and more than 42 percent are younger than 25 years old. A study has shown that reducing the cost of Internet access can help connect more people. To address the challenge of connectivity, several small-scale and large-scale efforts have been aimed at connecting the offline people around the globe. Unfortunately, these efforts have not been very successful over the last decade. These efforts help people with Internet connectivity, but they require funding and ongoing technical support, which are both hard to provide, given the cost of existing solutions.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

A ground station can include control channel receiver circuitry to receive airborne vehicle control channel packets from an airborne vehicle, control channel decode circuitry to determine contents of the airborne vehicle control channel packets, radio circuitry to provide uplink data to and receive downlink data from the airborne vehicle, processing circuitry, and a memory device coupled to the processing circuitry, the memory device including a program stored thereon for execution by the processing circuitry to perform operations, the operations comprising: determining, based on contents of the airborne vehicle control channel packets, that the airborne vehicle is or will be within a specified distance of the radio circuitry, and waking up the radio circuitry to receive data from or transmit data to the airborne vehicle.

A method can include receiving, at control channel receiver circuitry, airborne vehicle control channel packets from an airborne vehicle, determining, by control channel decode circuitry, contents of the airborne vehicle control channel packets, providing, by radio circuitry, uplink data to and receiving downlink data from the airborne vehicle, determining, based on contents of the airborne vehicle control channel packets, that the airborne vehicle is or will be within a specified distance of the radio circuitry, and waking up the radio circuitry to receive data from or transmit data to the airborne vehicle.

A ground station can include control channel receiver circuitry to receive airborne vehicle control channel packets from airborne vehicles, control channel decode circuitry to determine contents of the airborne vehicle control channel packets, radio circuitry to receive downlink data from an airborne vehicle of the airborne vehicles, processing circuitry, and a memory device coupled to the processing circuitry, the memory device including a program stored thereon for execution by the processing circuitry to perform operations, the operations comprising determining and airborne vehicle of the airborne vehicles with which to associate based on the contents of the control channel packets.

A method can include receiving, by control channel receiver circuitry, airborne vehicle control channel packets from airborne vehicles, determining, control channel decode circuitry, contents of the airborne vehicle control channel packets, providing, by radio circuitry, uplink to and receiving downlink data from an airborne vehicle of the airborne vehicles, determining, based on data from the receiver circuitry, a received signal strength (RSS) of a signal from each of the airborne vehicles, determining, for each of the airborne vehicles and based on decoded data from the decode circuitry, a length of time the airborne vehicle will be within transmission range of the radio circuitry, determining, for each of the airborne vehicles and based on the RSS or decoded data from the decode circuitry, a bit-rate of a connection between the radio circuitry and the airborne vehicle, determining, for each of the airborne vehicles and based on the determined RSS, determined length of time, and the determined bit-rate, an association metric, and causing, by the radio circuitry, ground station association with the airborne vehicle associated with the greatest association metric.

A non-transitory machine-readable medium including instructions that, when executed by circuitry of a ground station, configure the ground station to perform operations comprising determining contents of airborne vehicle control channel packets, determining a received signal strength (RSS) of a signal from each of the airborne vehicles, determining, for each of the airborne vehicles and based on decoded data from the decode circuitry, a length of time the airborne vehicle will be within transmission range of radio circuitry of the machine, determining, for each of the airborne vehicles and based on the RSS or decoded data from the decode circuitry, a bit-rate of a connection between the radio circuitry and the airborne vehicle, determining, for each of the airborne vehicles and based on the determined RSS, determined length of time, and the determined bit-rate, an association metric, and causing the ground station to associate with the airborne vehicle associated with the greatest determined association metric.

DETAILED DESCRIPTION

Figure 1:
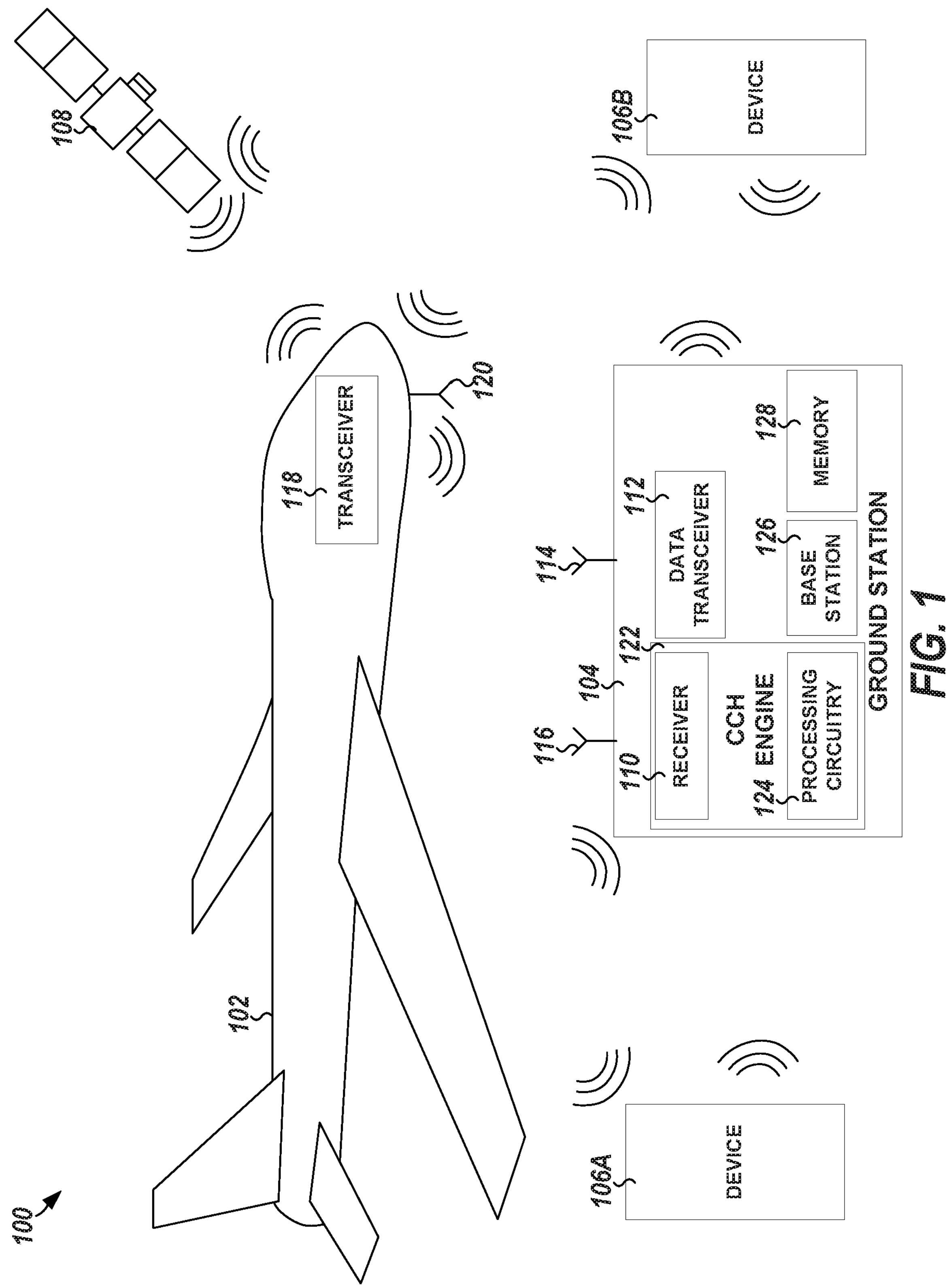
FIG. 1 illustrates, by way of example, a diagram of an embodiment of a system for providing a wireless communication between an airborne vehicle and a device.

In the following description, reference is made to the accompanying drawings that form a part hereof, and in which is shown, by way of illustration, specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or algorithms described herein may be implemented in software, in some embodiments. The software may include computer executable instructions stored on a computer or other machine-readable media or storage device, such as one or more non-transitory memories (e.g., a non-transitory machine-readable medium) or other type of hardware based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuit (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

As described above, it is estimated that more than half of the world's population cannot access the Internet. For example, a recent study by the International Telecommunications Union (ITU) estimated that 2.6 billion people cannot afford connectivity and that 3.8 billion do not have access. Recent proposals for providing low-cost connectivity include deploying long-lasting drones (e.g., drones with longer flight times between charge cycles) and Internet balloons deployed in the stratosphere. Examples include Project Loon and Aquila. Project Loon is by Google of Mountain View, Calif., United States of America (USA), and Aquila is by Facebook, Inc. of Menlo Park, Calif. USA. Project Loon and Aquila both propose creating custom aerial vehicles to provide Internet connectivity to devices. Embodiments of the disclosure provide an alternative, lower-cost approach to these proposals, by eschewing custom aerial vehicles and instead, using existing infrastructure. In particular, embodiments of this disclosure can leverage existing airborne vehicles to provide network connectivity (e.g., to the Internet or other packet-based network), such as to remote regions. A wireless router on the airborne vehicle can communicate with a ground station and provide internet connectivity, such as to a region that does not otherwise have such network connectivity.

Current solutions to providing Internet connectivity are too power hungry, costly, and do not allow for robust association decisions to be made in situations with unpredictable airborne vehicle paths. For example, in Project Loon and Aquila, the devices which serve as access points have a predictable flight path. This is not so with commercial aircraft, as a flight path of a commercial aircraft may change based on weather, pilot preference, or the like.

Embodiments can include an airborne vehicle (e.g., a drone, aircraft, or other manned or unmanned aerial vehicle) and a ground station. The ground station can associate with one of a variety of airborne vehicles within transmission range. Advantages of embodiments of this disclosure can include one or more of reduced power consumption or improved access point association to help ensure higher throughput, among other advantages.

Reduced power consumption can be achieved by using control channel signaling from an airborne vehicle to determine if and when to wake up transceiver circuitry of the ground station for non-control channel network traffic. When no airborne vehicles are within transmission range of the control channel transceiver circuitry, the transceiver circuitry can be powered off or placed in a sleep mode (e.g., a reduced power consumption mode).

The improved access point association can use the control channel signaling from the airborne vehicle to determine a location, bearing, speed, or the like for each airborne vehicle. The ground station can use this information to determine a bit-rate or association cost, and determine an association decision by considering an amount of time for which the airborne vehicle will be within transmission range of the ground station. This is an improvement over other methods because other methods either require regular schedules (thus putting the ground station to sleep around the schedule) or unnecessary power consumption.

The control channel can include use of existing automatic dependent surveillance-broadcast (ADS-B) signals, aircraft communication addressing and reporting system (ACARS), or other control channel communication from an airborne vehicle.

ADS-B is a global standard developed and maintained by the International Civil Aviation Organization (ICAO). An aircraft using ADS-B determines its position via satellite navigation and transponders and periodically broadcasts it, thus enabling tracking of the aircraft. ADS-B operates on a center frequency of 1090 MHz (1087.7-1092.3 MHz). Under the original standard, equipped air traffic control ground stations can receive the data and use it as a replacement for secondary radar. The ADS-B signal can also be received by other aircraft to provide situational awareness and ensure that the minimum separation between aircraft is maintained. In global flight tracking (GFT) an ADS-B signal is transmitted from the aircraft to a satellite no matter where it is flying.

ACARS is a communication protocol maintained by Aeronautical Radio, Incorporated (ARINC). ACARS communications are messages between aircraft and ground stations via radio or satellite. ACARS communications can include one of three broad types of air traffic control messages, aeronautical operational control, and airline administrative control. Control messages can be standardized according to ARINC Standard 633, or user-defined in accordance with ARINC Standard 618. The contents of such messages can be events, flight plans, weather information, equipment health, status of connecting flights, etc.

The ADS-B or ACARS signals can be used as a control channel, such as to help ensure that there is a sufficiently strong link between the airborne vehicle and a device. The ADS-B or ACARS signals can be used for detection or to provide information to the ground station. Embodiments can leverage various technological components of the existing infrastructure so that connectivity can be provided at a low cost. Embodiments can use a radio operating in a wireless fidelity or other wireless communication technology frequency band to communicate between the aircraft and ground stations, which can help keep the cost of embodiments reasonable.

In some examples, the described systems may utilize one or more wireless protocols to communicate between one or more airborne vehicle and one or more ground stations. Example wireless protocols may include protocols according to an 802.11 family of standards (commonly referred to as WI-FI) such as 802.11ac or 802.11hew, a 3GPP family of standards (such as Long Term Evolution (LTE)), and the like. The described systems may utilize one or more frequencies, such as frequencies in an industrial, scientific, and medical (ISM) frequency band, a licensed frequency band, or the like. The described systems may utilize one or more transceivers on the aircraft and the ground stations to communicate.

Advantages and further details of embodiments are discussed further with reference to one or more of the FIGS.

FIG. 1 illustrates, by way of example, a diagram of an embodiment of a system 100 for providing a wireless connection between an airborne vehicle 102 and a device 106A or 106B. The system 100, as illustrated, includes the airborne vehicle 102, a ground station 104, and devices 106A and 106B that are capable of network connectivity.

The airborne vehicle 102 can include one or more radios, such as transmit, receive, or transceiver radio 118. The radio 118 is electrically coupled to an antenna 120. The antenna 120 can include a monopole, dipole, loop, helical, slot, microstrip, a combination thereof. In one or more embodiments, the antenna 120 can include an antenna array, such as a phased antenna array. The antenna array can be capable of beamforming, multiple input multiple output (MIMO), uplink (UL) MIMO, downlink (DL) MIMO, multiple user (MU) MIMO, or otherwise directing an electromagnetic transmission in a specified direction. The antenna 120 can include an omni-directional antenna in one or more embodiments.

The ground station 104, as illustrated, includes a data transceiver 112, antennas 114 and 116, a control channel (CCH) engine 122, a base station 126, and a memory 128. The data transceiver 112 communicates packet-based data between the airborne vehicle 102 and the devices 106A, 106B. The data transceiver 112 can communicate uplink data received from the devices 106A, 106B to the airborne vehicle 102 through the antenna 114. The data transceiver 112 can communicate downlink data from the airborne vehicle 102 to the device 106A, 106B, through the antenna 114. The antenna 114 can include a monopole, dipole, loop, helical, slot, microstrip, or a combination thereof. In one or more embodiments, the antenna 114 can include an antenna array, such as a phased antenna array. The antenna array can be capable of beamforming or otherwise directing an electromagnetic transmission in a specified direction.

The antenna 116 can include a receive antenna to receive control channel communications from the airborne vehicle 102. The antenna 116 can receive signals in an ADS-B band or ACARS band, among others. ACARS operates on the very high frequency (VHF) (e.g., about 129 MHz—about 132 MHz) or high frequency (HF) bands. The antenna 116 can include a monopole, dipole, loop, helical, slot, microstrip, another antenna configuration, or a combination thereof. The antenna 116 can be an omni-directional antenna.

The processing circuitry 124 can decode communications received at the receiver 110, through the antenna 116. The processing circuitry 124 can determine if and when to wake up the data transceiver 112 or put the data transceiver 112 in a sleep mode or power off the transceiver 112 based on the decoded data. The sleep mode includes a power modality in which the transceiver 112 is consuming less power than it is when actively transferring data. In sleep mode the data transceiver 112 consumes minimal power while still being powered on. When the processing circuitry 124 detects that there is plane to/from which data can be transferred, it brings the transceiver 112 to full power. The sleep mode is similar to a laptop in hibernation mode.

The processing circuitry 124 can include one or more electric or electronic components (e.g., a central processing unit (CPU), a microcontroller, a field programmable gate array (FPGA), a graphics processing unit (GPU), an application specific integrated circuit (ASIC), a modulator, demodulator, power supply, one or more resistors, transistors, inductors, capacitors, diodes, regulators, logic gates (e.g., AND, OR, XOR, negate, etc.), buffer, memory, multiplexer, switch, or the like) configured for performing operations of the CCH engine 122. For example, the processing circuitry 124 can decode a communication from the airborne vehicle 102 to determine a bearing, location (e.g., latitude and longitude), signal strength, speed, elevation, or the like. The communication from the airborne vehicle 102, as previously discussed, can include an ADS-B, ACARS, or other airborne vehicle standard compliant communication.

Having low-powered base stations 126 (e.g., ground stations 104A-104C) can be a challenge for embodiments. To help address this, embodiments can include using a CCH based activation and de-activation of the ground station 104. The CCH engine 122 can be responsible for collecting and decoding information to assist in determining if and when to wake up the data transceiver 112 or antenna 114 and to put the data transceiver 112 or the antenna 114 in a sleep state.

The CCH engine 122 can provide input for activation of the data transceiver 112. In some embodiments, the CCH signals can be transmitted from the airborne vehicle 102 at a higher power than the signals to/from the data transceiver 112. The CCH engine 122 can determine that an airborne vehicle 102 will be within transmission range of the data transceiver 112 before the airborne vehicle 102 is within transmission range of the transceiver 112. This is because the CCH data from the airborne vehicle 102 can be provided at a higher power and/or or a lower frequency than the network data, thus giving the CCH data from the airborne vehicle 102 a larger transmission range than the transmission range of the transceiver 112.

The base station 126 can provide network connectivity or communications capability. The base station 126 can use a whitespace, cellular, or other spectrum over which to provide communications capability.

The memory 128 can include data to be transmitted (e.g., in an uplink) to the airborne vehicle 102 or transmitted (e.g., in a downlink) to the device 106A, 106B. The memory 128 can include data regarding latitude, longitude, speed, bearing, pressure, altitude, callsign, destination, or schedule of one or more airborne vehicles, such as the airborne vehicle 102. The memory 128 can include a data downlink schedule or uplink schedule for the device 106A, 106B to communicate with the airborne vehicle 102. Any of the airborne vehicle schedule, uplink schedule, or downlink schedule can be received through the CCH engine 122 or the data transceiver 112.

The airborne vehicle 102 can achieve network connectivity through the satellite 108 or a different ground station (not shown). The satellite 108 can communicate using a Ka band, Ku band, or other spectrum discussed elsewhere herein.

The device 106A, 106B can gain network connectivity through one or more of the airborne vehicle 102 and the ground station 104. The device 106 can be in a region that doesn't otherwise have network connectivity. Using the system 100, the device 106A can communicate with another device 106B, website, webserver, or the like. The communication can include an email, instant message, blog post, image, video, or the like. Using the system 100, the device 106A, 106B can download content from a database, server, or other content host, such as can include news, a weather update, social media pages, or other web page. The system 100 can provide means for a sensor device (e.g., an Internet of things (IoT) device) to communicate data to a server, database, or the like, such as to facilitate communications to/from an Internet of things (IoT) device. The system 100 allows such IoT devices to be in more remote locations than was possible previously. For example, the IoT device can be in a forest, desert, agricultural tract, on a body of water, or the like.

The airborne vehicle 102 has network access either through communication with the satellite 108 over the Ku (about 12-18 Giga Hertz) or Ka about (26.5-40 Giga Hertz) bands, or from a ground station (not illustrated in FIG. 1) that is connected to or can connect to the network. In some embodiments, the airborne vehicle 102 can cache content (in a memory thereof) to be uploaded to the network from the device 106A, 106B or the ground station 104 and sync content when the airborne vehicle 102 regains network connectivity.

As illustrated in FIG. 1, the connectivity of the airborne vehicle 102 can be extended to one or more ground stations 104. Each airborne vehicle 102 can be equipped with an antenna 120 (e.g., an antenna or an antenna array, such as a phased antenna array), and a transceiver radio 118 that communicates network data with the ground station 104. This equipment is in addition to the other transceivers that are on the airborne vehicle 102. Although weight of the additional transceiver and antenna circuitry could be a potential concern, the extra equipment on the airborne vehicle 102 can be as light as three pounds or less.

The ground station 104 can include one or more radios (e.g., receiver 110 and transceiver 112) and one or more corresponding antennas 114 and 116 that can be configured to communicate with the airborne vehicle 102. In some embodiments, the antenna 116 includes a phased array antenna, such as to maximize the coverage of the horizon, while also providing gain. Since the antenna configuration of each device 106A, 106B can be different, embodiments can use an alternative technology such as an open cellular platform, a TV white space, Wi-Fi access point, a point-to-point link, or general packet radio service (GPRS), for connectivity through the transceiver 112.

For embodiments, such as one that includes an IoT device, that consume relatively low throughput, data can be modulated over a narrow bandwidth that has a lower noise floor than other embodiments. In such embodiments, the antenna 114 or 116 of the ground station 104 or the airborne vehicle 102 does not need as much gain as wider bandwidth embodiments. Further, each IoT device can include an omni-directional antenna, such as like the antenna 116. In one or more embodiments, each device 106A, 106B can communicate directly with the airborne vehicle 102, as opposed to communicating with the airborne vehicle 102 through the ground station 104.

To achieve sufficient connectivity between the ground station 104 and the airborne vehicle 102, embodiments can provide innovations to overcome one or more of the following challenges: (1) ensuring a threshold throughput between the airborne vehicle 102 and the ground station 104, such as by dynamically adapting wireless parameters. Using a Wi-Fi protocol, as opposed to Wi-Fi spectrum, or any existing ground communication system, as is can lead to poor throughput. Existing air-to-ground (ATG) systems, such as the ATG4 from Gogo, Inc. of Chicago, Ill., USA, uses a slower evolution data optimized (EVDO) technology; (2) embodiments can scale to multiple airborne vehicles 102 and ground stations 104 (see FIG. 3). Embodiments can accomplish this using a media access control (MAC) protocol that accommodates mobile access points. In contrast to Wi-Fi or cellular systems where the clients are more mobile relative to the base station 126, in embodiments, the airborne vehicles 102 (e.g., base stations 126, such as access points) travel faster and farther than the devices 106A, 106B, thus making the airborne vehicles 102 more mobile than the devices 106A, 106B and the ground station 104. Embodiments can seek an optimization that considers multiple parameters: the devices 106A, 106B can associate with the airborne vehicle 102 that is close enough to provide a signal with sufficient signal strength, has sufficient available bandwidth, or that provides association for a sufficient period of time; and (3) ground stations 104 can support a low-power mode to allow IoT devices to communicate with the airborne vehicle 102. Having the ground station 104 powered on and operating all the time can consume too much power, and an IoT device with a low duty cycle might miss communication opportunities with an airborne vehicle 102 if the ground station 104 is not powered on and operating at a specific time.

The following sections describe (i) improving throughput between the airborne vehicle 102 and the ground station 104, (ii) reducing power consumption of the ground stations 104, and (iii) ensuring network performance for a common expected case of having multiple airborne vehicles 102 and ground stations 104.

Control Channel Assisted Airborne Vehicle Discovery

All three challenges previously discussed can benefit from a technique for a ground station 104 to learn about the presence of a sufficiently close airborne vehicle 102 (e.g., within transmission range, such as to be able to transmit or receive a signal with a specified signal strength, which can be dependent on environmental conditions, such as weather, cloud cover, or the like). The ground station 104 can determine when there is an airborne vehicle 102 sufficiently close. In response to determining whether the airborne vehicle 102 is sufficiently close or will likely be sufficiently close, the ground station 104 can wake up one or more components of the ground station 104, such as by allowing electrical power to flow to the one or more components.

One approach to such power saving can include downloading a schedule of airborne vehicle flights and waking up the ground station 104, in response to determining an airborne vehicle 102 will be in a specified geographical region based on the schedule. However, the airborne vehicle 102 can be delayed or can deviate from a scheduled flight path (e.g., due to wind, weather, or the like), thus making this method susceptible to errors. Another approach can include performing active polling, in which a ground station 104 periodically probes for an incoming airborne vehicle 102. However, such an approach adds latency in establishing the link, and introduces extra signaling on a channel. To circumvent these challenges, embodiments can use a control-channel monitoring based approach.

In some embodiments, the control channel (e.g., an ADS-B or ACARS channel) can be implemented using the receiver 110. Some airborne vehicles 102 include an ADS-B, ACARS, or other control channel radio (e.g., receive and transmit radio, sometimes called a transceiver 112). In such embodiments, it is not necessary to use a separate radio on the airborne vehicle 102 to implement the control channel. ADS-B signals may be sent at 1090 MHz or 978 MHz, with a 50 kHz or 1.3 MHz bandwidth, respectively. ADS-B signals can be encoded using pulse position modulation (PPM). Airplanes currently use these signals as an alternative to secondary surveillance radar (SSR). Using ADS-B or other control channel, the airborne vehicle 102 can transmit its latitude, longitude, speed, bearing, pressure, altitude, callsign, etc. in separate messages with a size of 112 bits. Each packet in ADS-B is identified using some data fields known as downlink format (bits 1 to 5) and type codes (bits 33 to 37).

Figure 2:
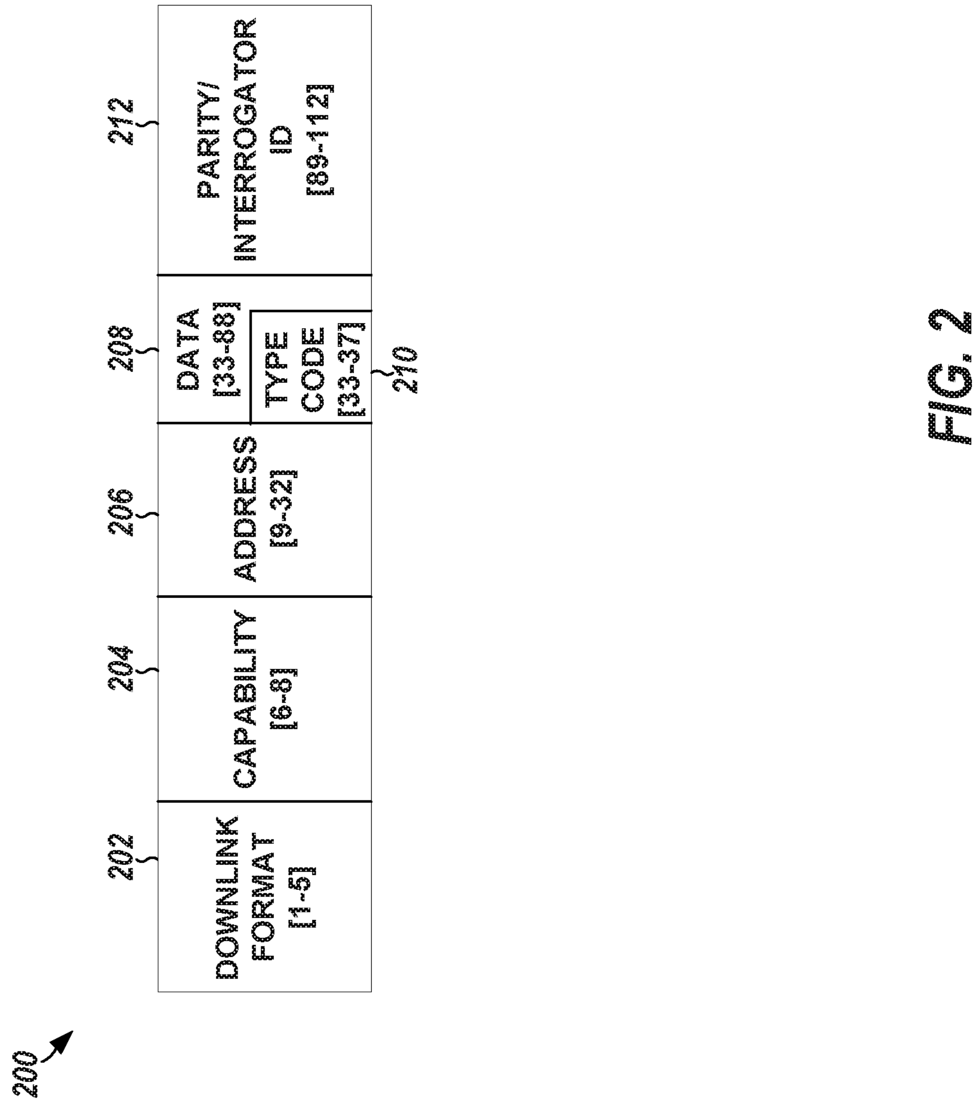
FIG. 2 illustrates, by way of example, a diagram of an embodiment of an ADS-B packet.

FIG. 2 illustrates, by way of example, a diagram of an embodiment of an ADS-B packet 200. The ADS-B packet 200, as illustrated, includes a downlink (DL) format field 202, a capability field 204, an address field 206, a data field 208, and a parity/interrogator identification (ID) field 212. A type code 210, which occupies a portion of the data field 208, indicates the type of information included in the packet 200. Type codes 210 include aircraft ID, surface position, airborne position with baro altitude, airborne velocity, and airborne position with global navigation satellite system (GNSS) height. Currently, not all type codes 210 are used. For example, a study showed that type codes 210 for surface position (types 5-8) and reserved type codes are not currently used (e.g., type codes 25-27 and 30).

One or more embodiments include the airborne vehicle 102 transmitting packets 200 that include specified (e.g., currently unused) type codes 210. These packets 200 can carry data in the data field 208, such as a current network load or available network bandwidth capacity. The airborne vehicle 102 can provide data to the ground station 104 using packets 200 with a specified type code, specified downlink format (e.g., DL format 17), and specified type code 210 decode process. The DL format 17 is for broadcast and caps a maximum packet rate to a few packets 200 per second. Embodiments can thus have a lightweight, push-based approach, where the airborne vehicle 102 signals their presence without clogging the data channel, such as by using ADS-B signals as a control channel.

ADS-B signals and other control channel signals can be transmitted using a lower frequency, and can be sent at a higher power (relative to the network data signals from the transceiver radio 118). The network data signals are generally sent at a higher frequency and a lower power (lower relative to the control channel signals). Hence, control channel signals generally propagate farther than the network data signals, which can be transmitted using a Gigahertz frequency (e.g., 2.4 GHz). Such a range mismatch between the control channel and data channel has been shown to cause inefficiencies in protocol design. For example, when the control channel is used as a contention medium, then more devices 106 can receive or sense the transmission on the control channel, and backoff, while they might never have heard the packets 200 on the data channel. Embodiments do not have a range mismatch problem, because, in these embodiments, the ground station 104 does not transmit on the control channel. In such embodiments, only the airborne vehicle 102 transmits on the control channel. The ground station 104, which can include the receiver 110, can act on these signals for control operations, such as associations, handoffs, power control, or the like.

The data already being sent using the control channel radios from the airborne vehicle 102 provide useful information for identifying an airborne vehicle 102 to which to associate. The control channel data can be used to predict how long an airborne vehicle 102 will be able to offer connectivity, such as to improve throughput or media access control (MAC).

Media Access Control (MAC)

Figure 3:
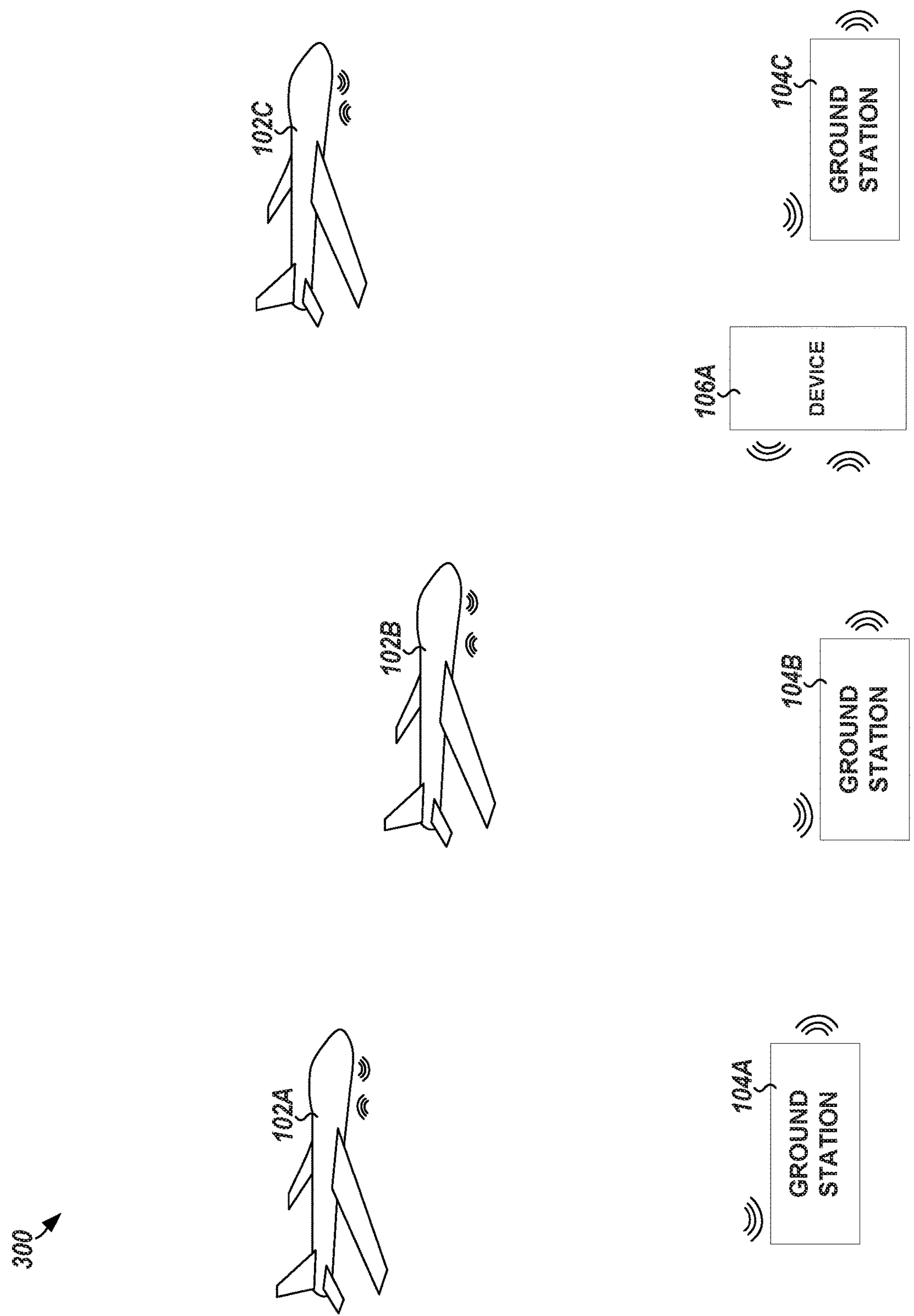
FIG. 3 illustrates, by way of example, a diagram of an embodiment of a system that includes multiple airborne vehicles and multiple ground stations.

FIG. 3 illustrates, by way of example, a diagram of an embodiment of a system that includes multiple airborne vehicles 102A, 102B, and 102C and multiple ground stations 104A, 104B, and 104C. In embodiments, the device 106A has an option of associating with one of the ground stations 104A-104C, which each have an option of associating with one of the multiple airborne vehicles 102A-102C. In other embodiments, the device 106A has the option of associating directly with one of the multiple airborne vehicles 102A-102C. This section describes solutions that handle situations in which there are multiple ground stations 104A-104C or multiple airborne vehicles 102A-102C.

When there are multiple airborne vehicles 102A-102C in transmission range of the ground station 104A-104C or device 106A, the ground station 104A-104C or device 106A can associate with the airborne vehicle 102A-102C that is more likely to provide the best service for its demand. Some ground stations 104A-104C or devices 106A, 106B might have significant demand, while others, such as IoT sensors, might have lighter demand (e.g., fewer packets or less data to transmit). Formally, a problem solved by a ground station 104A-104C or device 106A, 106B can include minimizing (or reducing) a time taken to transmit packets from all ground stations 104. This optimization problem is non-deterministic polynomial time (NP)-complete and a solution to the problem requires knowledge of relative position between the airborne vehicles 102A-102C and the ground stations 104A-104C or device 106A. Solving this problem at the ground station 104A-104C or device 106A can cause significant messaging overhead, and can take more time than solving the problem is worth.

Instead of solving the NP-complete problem, embodiments can use an approximate technique. Each ground station 104A-104C or device 106A can make an independent decision about which airborne vehicle 102A-102C to which to associate, without requiring coordination with other ground stations 104A-104C or devices 106A, 106B. Even though the discussion that follows regards ground station 104A-104C associated with an airborne vehicle 102A-102C, it will be understood that the association can be between the ground station 104A-104C or the device 106A, 106B and the airborne vehicle 102A-102C. Thus, the device 106A, 106B can include circuitry to perform the association.

Airborne Vehicle Association

The problem of associating a ground station 104A-104C to the airborne vehicle 102A-102C is different from prior wireless technologies, such as in Wi-Fi and cellular networks. In most wireless systems, the clients can be more mobile than the base stations 126. In embodiments, the clients (ground stations 104A-104C or devices 106A, 106B) are mostly fixed, and the base stations (airborne vehicles 102A-102C) are mobile. For Wi-Fi and cellular systems, the clients typically associate to the base station 126 with the best signal strength that is likely to provide enough bandwidth to the associating client. For embodiments, such a system does not account for the duration of connectivity. An airborne vehicle 102A-102C that is only available for shorter periods of time might not provide enough time for a ground station 104A-104C to transmit and receive packets. High throughput can be an incentive to connect to the nearest airborne vehicle 102A-102C. When the ground station 104A-104C connects to the nearest airborne vehicle 102A-102C it generally gets the highest throughput. Contrary to this, if every ground station 104A-104C chooses the nearest airborne vehicle 102A-102C, that airborne vehicle 102A-102C can be forced to serve more ground stations 104A-104C as compared to connecting to the farthest airborne vehicle 102A-102C (that is still within transmission range) or a random airborne vehicle 102A-102C (that is within transmission range). Farthest is in terms of distance to the ground station 104A-104C.

Loon and other satellite systems also have mobile access points (APs), similar to embodiments, but the problem of association is usually very simple—associate to the satellite 108 or Loon with the strongest signal strength. This is the case because of predictable mobility of these systems with respect to an orbit, or wind current. The airborne vehicles 102A-102C on the other hand, go to different, sometimes unpredictable, destinations in different directions, and might even take different paths to destinations based on wind currents or weather. At a time that multiple airborne vehicles 102A-102C can service the ground station 104A-104C, the decision about with which airborne vehicle 102A-102C to associate can depend on several factors. In embodiments, these factors can include one or more of: wireless signal strength (e.g., the quality of the link between the airborne vehicle 102A-102C and the ground station 104A-104C); duration of connectivity (e.g., depending on the flight path, the time for which the airborne vehicle 102A-102C will be within transmission range of the ground station 104A-104C and able to serve the ground station 104A-104C); and load on airborne vehicle 102A-102C (e.g., each airborne vehicle 102A-102C might be serving several ground stations 104A-104C, and, depending on the amount of traffic, the ground station 104A-104C can associate to the airborne vehicle 102A-102C carrying a least amount of traffic).

Instead of associating with the airborne vehicle 102A-102C with the strongest signal strength, each ground station 104A-104C can use a different metric to select the airborne vehicle 102A-102C with which to associate. The ground station 104A-104C can select the airborne vehicle 102A-102C that provides a best average data rate for a period of time while accounting for handoff overhead.

In determining the best average data rate, the ground station 104A-104C can consider one or more of signal strength (received signal strength indicator (RSSI)), current load on the airborne vehicle 102A-102C (L), bearing of the airborne vehicle 102A-102C (B), speed of the airborne vehicle 102A-102C (s), backhaul capacity (C), location of the ground station 104A-104C, location of the airborne vehicle 102A-102C, and an overhead cost of associating with a different airborne vehicle 102A-102C (Δ). For RSSI, signal strength of the control channel signal from the airborne vehicle 102A-102C can be used as a proxy for the signal strength of a data link. L can be an amount of data currently being served by an airborne vehicle 102A-102C. B is the direction of the airborne vehicle 102A-102C, and an indicator of the variation of signal strength with time. s is speed of the airborne vehicle 102A-102C. C is the total capacity to an available network connection, either via satellite 108 or other techniques. The data, L, s, B, location of the airborne vehicle 102A-102C, and C, can be provided in control channel packets. The RSSI can be derived by the ground station 104A-104B from receiving a control channel packet. Δ depends on the scanning overhead, as well as, in some embodiments, an amount of time it takes to estimate new parameters for beamforming. An overhead of obtaining a new Internet Protocol (IP) address can be included in Δ.

A time period for which an airborne vehicle 102A-102C is connected to the ground station 104A-104C can be estimated as a time for which a distance between the ground station 104A-104C and the airborne vehicle 102A-102C is less than a specified distance, d. d can be a transmission range of the ground station 104A-104C.

Consider an airborne vehicle 102A-102C currently at a latitude of lt1 and longitude of lg1, then the new latitude ltn and longitude lgn after time t can be estimated as follows:

$$ltn = a\ \sin(\sin(lt1)\cos(\delta)+\cos(lt1)\sin(\delta)\cos(\theta)) \quad \text{Equation 1}$$

$$lgn = lg1 + a\ \tan 2(\sin(\theta)\sin(\delta)\cos(lt1), \cos(\delta)-\sin(lt1)\sin(ltn)) \quad \text{Equation 2}$$

Where θ is the bearing clockwise from north, δ is the angular distance d/R, where R is the Earth's radius, and d is the distance traveled (e.g., s*time). Equations 1 and 2 can be used to estimate T, the total time the airborne vehicle 102A-102C will be in communication range with the ground station 104A-104C. It is likely that an airborne vehicle 102A-102C that is in communication range of the ground station 104A-104C for the longest period of time will also have a period of highest signal strength for the ground station 104A-104C, and therefore the highest data rates to send and receive the most data during that time period. T can be dependent on the communication protocol being used to communicate between the airborne vehicle 102A-102C and the ground station 104A-104C. Based on the protocol being used for data transfer, T can be estimated.

This approach to location prediction can provide accurate results. The median error for predictions five minutes ahead of time can be around 2 kilometers.

Embodiments can consider an average bandwidth that can be achieved by associating with the airborne vehicle 102A-102C. In addition to the time, T, an achievable bit-rate, BR, to each airborne vehicle 102A-102C can be determined based on Equation 3.

$$BR = \min(\text{Capacity}(RSSI), (C-L)) \quad \text{Equation 3}$$

Where capacity approximates the bit-rate based on signal strength. The association metric for some embodiments is provided in Equation 4.

$$\text{Association Metric} = (BR*T)/(T+\Delta) \quad \text{Equation 4}$$

Each of the ground stations 104A-104C can determine the association metric for each airborne vehicle 102A-102C within transmission range and associate with the airborne vehicle 102A-102C for which the association metric is highest. When there are several airborne vehicles 102A-102C within transmission range, the time which it takes the ground station 104A-104C to associate with the airborne vehicle 102A-102C is directly proportional to Δ. If Δ is smaller, then the ground station 104A-104C can select the aircraft with the best bit-rate BR (e.g., consistent with Equation 4). If Δ is large, then the ground station 104A-104C can connect to the airborne vehicle 102A-102C that is determined to provide the longest duration of connectivity (e.g., consistent with Equation 4).

Handoffs

Handoffs in embodiments with mobile base stations are non-trivial. An antenna 114 at the ground station 104A-104C might be configured for beamforming transmission toward an airborne vehicle 102A-102C, while there might be a better airborne vehicle 102A-102C with which to associate in a different beamforming direction, which cannot be heard by the antenna 114 as it can be configured for a particular direction. Embodiments can address this challenge using an ADS-B control channel antenna 116. The ADS-B receiver 110 can be omnidirectional, and can receive overloaded ADS-B signals even when the data radio antenna 114 is pointed towards an airborne vehicle 102A-102C in another direction. The ground station 104A-104C can periodically, intermittently, or continually scan for airborne vehicles 102A-102C and compute the corresponding association metric values. When there is an airborne vehicle 102A-102C with an association metric value below δ of the currently associated airborne vehicle 102A-102C, the ground station 104A-104C can hand off to the airborne vehicle 102A-102C with the largest association metric.

In one or more embodiments, the ground station 104A-104C can associate with multiple airborne vehicle 102A-102C. However, these embodiments can be complicated because the ground antenna 116 can be directional and pointed towards one airborne vehicle 102A-102C, such as to increase a signal strength of the link. A phased array antenna or an electronically steerable antenna array can provide enough gain, and can establish associations to multiple airborne vehicles 102A-102C. Such embodiments can include a multi-homing architecture that can be used for resilient connections as well as to increase the throughput of the network. In one or more embodiments, beamforming and null-forming patterns can be used to communicate with multiple airborne vehicles 102A-102C without causing interference at the other airborne vehicles 102A-102C. Null-forming can be beneficial when the number of airborne vehicles 102A-102C exceeds a number of frequency channels and beamforming by itself hurts the performance of listen-before-talk systems.

MAC Protocol

Although embodiments can use a Wi-Fi based chipset and protocol. Wi-Fi's carrier sense based protocol may not be ideal for ground-to-air or air-to-ground communication. Ground stations 104A-104C will likely not hear each other since some of their transmissions can be pointed towards the airborne vehicle 102A-102C. Hence, using collision sense multiple access (CSMA) will likely result in collisions at the airborne vehicle 102A-102C. Consider that the ground stations 104A-104C can hear the transmissions from the airborne vehicle 102A-102C. The Wi-Fi MAC can be modified such that the ground stations 104A-104C transmit only in response to receiving an indication to transmit from the airborne vehicle 102A-102C. When the airborne vehicle 102A-102C has nothing to transmit, it can still transmit a NULL frame, indicating to the ground station 104A-104C that the airborne vehicle 102A-102C is available for association. In response to receiving a downlink frame, the ground station 104A-104C can transmit one or more packets to the airborne vehicle 102A-102C. The airborne vehicle 102A-102C can limit a number of packets that can be sent by the ground station 104A-104C based on the number of other ground stations 104A-104C the airborne vehicle 102A-102C is currently serving. Data provided in the control channel can indicate a communication protocol to be used or the communication protocol can be agreed upon in advance.

Embodiments can be architected for bulk transfer as opposed to real-time traffic. In embodiments, the duty cycle of a ground station 104A-104C can be on the order of hundreds of milliseconds (ms), such as 100 ms, 200 ms, 300 ms, 400 ms, 500 ms, etc. or a time therebetween. The time allocated to each ground station 104A-104C can depend on how many other ground stations are associated to the airborne vehicle 102A-102C. This scheme is different from a standard time domain multiple access (TDMA) scheme. In embodiments, the ground stations 104A-104C make independent decisions of which airborne vehicle 102A-102C to connect to. In embodiments, a time of when to transmit might be slightly off compared to the tight synchronization requirements of TDMA schemes.

This design can overcome a couple of challenges. First, there are occasions when the ground station 104A-104C can transmit without a downlink signal, for example during association. Second, there can be a communication channel among airborne vehicles 102A-102C, such as to help ensure that the airborne vehicles 102A-102C are not all using the same channel, such as to reduce communication interference. Otherwise, uplink traffic from ground stations 104A-104C might collide at the airborne vehicle 102A-102C.

Embodiments can address these challenges by leaving a control slot unused to allow for control traffic. This control slot can be indicated in a control channel frame. This slot can be used to send data from the ground stations 104A-104C that have very little data, such as from IoT sensors. To coordinate channel allocation between the airborne vehicles 102A-102C, a channel number can be indicated in an ADS-B assisted control channel (BACH) packet. In one or more embodiments, the ground station 104A-104C can transmit a channel list of all the airborne vehicles 102A-102C within transmission range. The channel list can include the global positioning system (GPS) coordinates of corresponding airborne vehicles 102A-102C within transmission range. The channel list can be provided to the airborne vehicle 102A-102C to which the ground station 104A-104C is associated. In embodiments, the airborne vehicle 102A-102C can decide to select a least loaded channel over which to communicate to the ground station 104A-104C.

Spectrum Considerations

In the US and many other countries, the frequency range 2400-2483.5 MHz (2.4 GHz band) is authorized for use by devices 106 that do not require individual licenses. Depending on the country, these devices 106 are referred to as unlicensed devices, license-exempt devices, class licensed, etc., with some changing to the wording based on the country. The general rule is that unlicensed devices cannot cause harmful interference to—and cannot claim protection from interference from—any device 106 operating in the 2.4 GHz and adjacent bands. There is typically a minimum set of technical rules for these unlicensed operations, which serves to create a low barrier for innovation as well as a low compliance cost. Further, in the International Table of Frequency Allocation, mobile and fixed services are co-primary in this spectrum range, and there is no prohibition on aeronautical mobile use. The 2.4 GHz band is home to technologies such as Bluetooth, ZigBee, and Wi-Fi® Certified devices that are compliant with different WLAN standards developed by IEEE 802.11.

With respect to embodiments, GFT provides an opportunity for all commercial aircraft to be equipped with control channel transmit radios, creating even greater economies of scale, resulting in lower costs for passive components (e.g., ADS-B tuner) for some embodiments. A commercial aircraft (and many general aviation aircraft) can have two ADS-B antennas, one for ground stations 104A-104C and one for satellites 108. In embodiments, the CCH engine 122 can receive the control channel signal transmitted by an aircraft and use type codes for data not currently supported by the ADS-B standard. The control channel signal can arrive before the aircraft is in network data range with a high probability because of low frequency and high transmit power of the ADS-B signals. The time difference depends on factors such as the control channel transmitted power level, the receiver sensitivity at the ground station 104, and atmospheric propagation. In embodiments, there are no control channel transmissions that originate from the CCH engine 122, thus not adding control channel interference.

Embodiments can provide a communications methodology and architecture aimed at providing opportunistic connectivity to people and devices 106, such as in remote and underserved regions of the world. Embodiments can leverage BACH to provide a low power base station design and media access control for helping guarantee higher throughput at a low cost. Contrary to solutions proposed by Google and Facebook for connectivity, embodiments can consume lower-power and be monetarily inexpensive via leveraging of the existing widescale infrastructure of commercial air transport.

Figure 4:
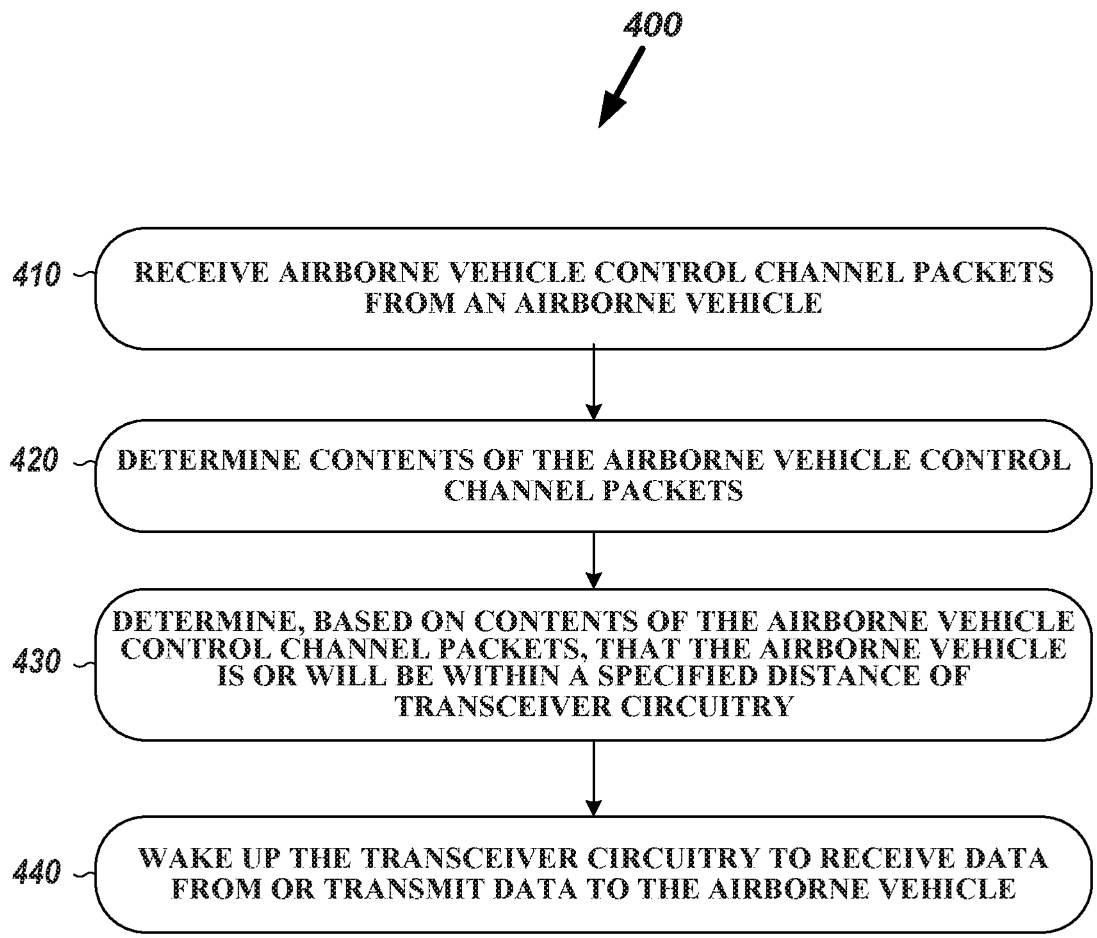
FIG. 4 illustrates, by way of example, a diagram of an embodiment of a method for reducing power consumption of a ground station.

FIG. 4 illustrates, by way of example, a diagram of an embodiment of a method 400 for reducing power consumption of a ground station 104. The method 400 as illustrated includes receiving airborne vehicle control channel packets from an airborne vehicle, at operation 410; determining content of the airborne vehicle control channel packets, at operation 420; determining, based on contents of the airborne vehicle control channel packets, that the airborne vehicle is or will be within a specified distance of transceiver circuitry, at operation 430; and waking up the transceiver circuitry to receive data from or transmit data to the airborne vehicle (in response to determining the airborne vehicle is or will be within the specified distance of the transceiver circuitry), at operation 440.

The operation 410 can be performed by control channel receiver circuitry. The operation 420 can be performed by control channel decode circuitry. The method 400 can further include providing, by transceiver circuitry, uplink data to and receiving downlink data from the airborne vehicle. The method 400 may further include, wherein the receiver circuitry includes an omni-directional antenna.

The method 400 may further include, wherein the transceiver circuitry includes a directional antenna. The method 400 may further include determining that the airborne vehicle is no longer within transmission range of the transceiver circuitry, and in response to determining that no airborne vehicle is within transmission range of the transceiver circuitry, putting the transceiver circuitry in a reduced power consumption mode.

The method 400 may further include, wherein waking up the transceiver circuitry includes waking up the transceiver circuitry before the airborne vehicle is within transmission range of the transceiver circuitry. The method 400 may further include, wherein the control channel packets are provided over a frequency lower than a frequency over which the transceiver circuitry operates. The method 400 may further include, wherein the control channel receiver circuitry operates over an automatic dependent surveillance broadcast (ADS-B) band or an aircraft communications addressing and reporting system (ACARS) band.

Figure 5:
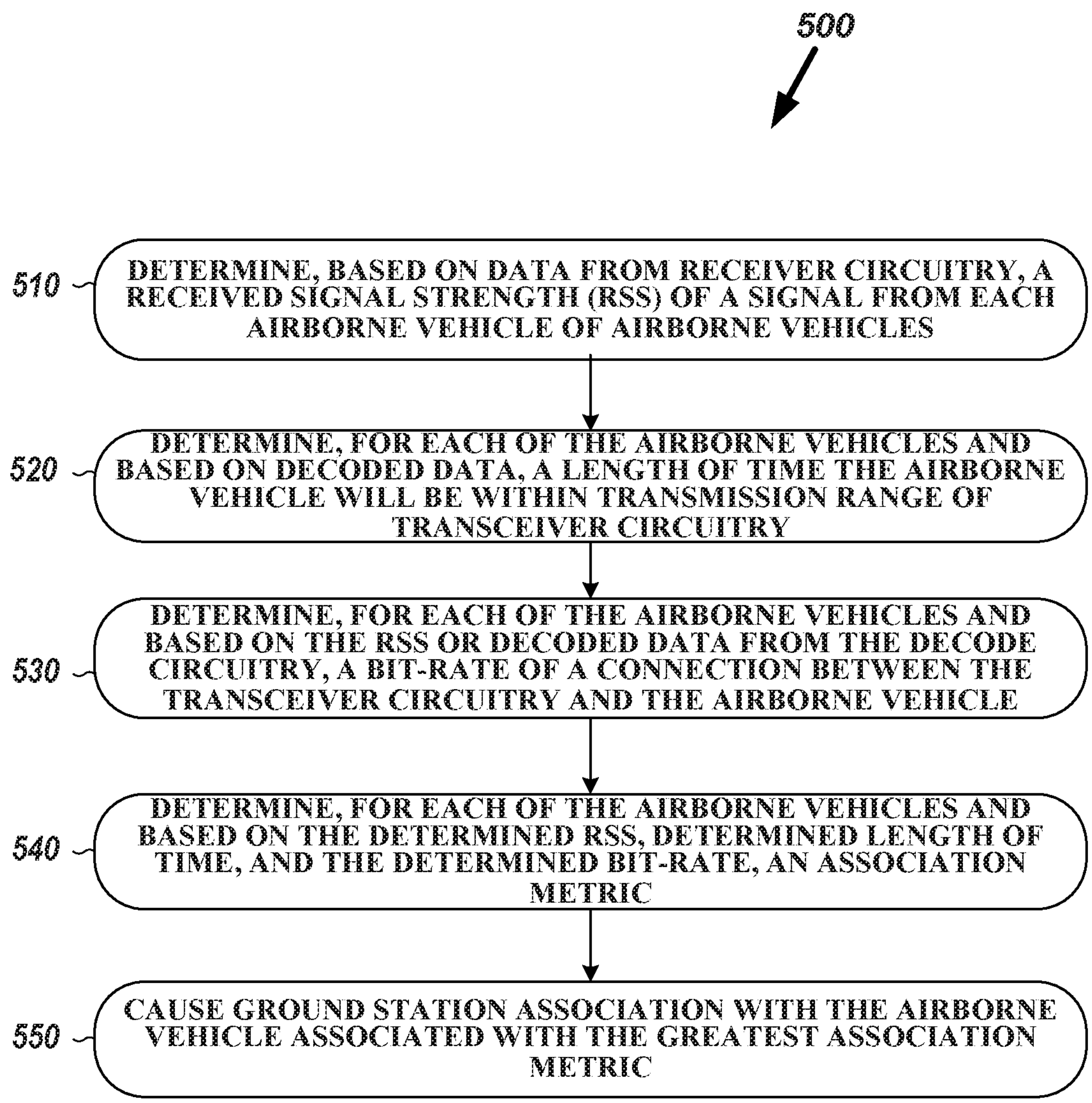
FIG. 5 illustrates, by way of example, a diagram of an embodiment of a method for determining an airborne vehicle with which to associate.

FIG. 5 illustrates, by way of example, a diagram of an embodiment of a method 500 for determining an airborne vehicle 102 with which to associate. The method 500 as illustrated includes determining, based on data from the receiver circuitry, a received signal strength (RSS) of a signal from each of the airborne vehicles, at operation 510; determining, for each of the airborne vehicles and based on decoded data from the decode circuitry, a length of time the airborne vehicle will be within transmission range of the transceiver circuitry, at operation 520; determining, for each of the airborne vehicles and based on the RSS or decoded data from the decode circuitry, a bit-rate of a connection between the transceiver circuitry and the airborne vehicle, at operation 530; determining, for each of the airborne vehicles and based on the determined RSS, determined length of time, and the determined bit-rate, an association metric, at operation 540; and causing, by the transceiver circuitry, ground station association with the airborne vehicle associated with the greatest association metric, at operation 550.

The method 500 can further include receiving, by control channel receiver circuitry, airborne vehicle control channel packets from airborne vehicles. The method 500 can further include determining, control channel decode circuitry, contents of the airborne vehicle control channel packets. The method 500 can further include providing, by transceiver circuitry, uplink to and receiving downlink data from an airborne vehicle of the airborne vehicles, The method 500 can further include, wherein the decoded data from the decode circuitry includes, for each of the airborne vehicles, a bearing, a speed, a latitude, and a longitude of the airborne vehicle. The method 500) can further include, wherein determining the length of time the airborne vehicle will be in transmission range of the transceiver circuitry includes determining the length of time based on the bearing, the speed, the latitude, and the longitude. The method can further include, wherein the decoded data from the decode circuitry includes, for each of the airborne vehicles, a backhaul capacity and a current load of network traffic being served by the airborne vehicle.

The method 500 can further include, wherein the association metric is further determined based on a difference between the backhaul capacity and the current load of network traffic being served by the airborne vehicle. The method 500 can further include, wherein the association metric is further determined based on an overhead metric, the overhead metric indicates an amount of time it takes to associate with a different airborne vehicle of the airborne vehicles. The method 500 can further include, wherein the overhead metric further indicates an amount of time it takes to determine beamforming parameters for transceiver circuitry communication with the airborne vehicle.

The method 500 can further include, wherein the association metric equals the determined bit rate times the determined length of time divided by a sum of the determined length of time and a handoff overhead metric. The method 500 can further include, wherein the control channel receiver circuitry operates over an automatic dependent surveillance broadcast (ADS-B) band or an aircraft communications addressing and reporting system (ACARS) band.

Figure 6:
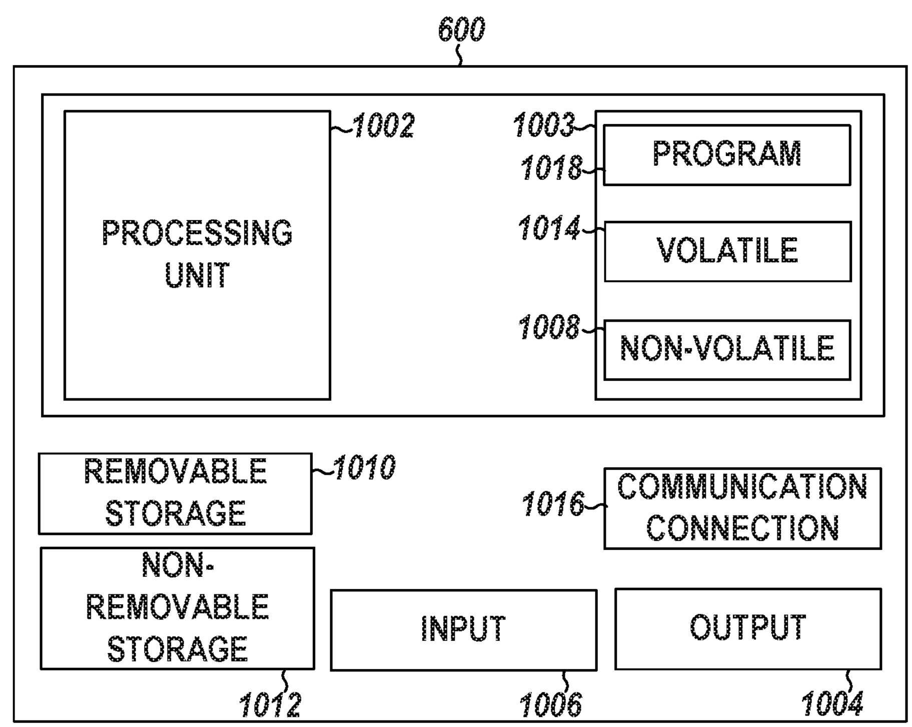
FIG. 6 illustrates, by way of example, a block diagram of an embodiment of a machine (e.g., a computer system) to implement or be used in one or more embodiments.

FIG. 6 illustrates, by way of example, a block diagram of an embodiment of a machine 600 (e.g., a computer system) to implement one or more embodiments. One example machine 600 (in the form of a computer), max include a processing unit 1002, memory 1003, removable storage 1010, and non-removable storage 1012. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices, such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 1003 may include volatile memory 1014 and non-volatile memory 1008. The machine 600 may include—or have access to a computing environment that includes—a variety of computer-readable media, such as volatile memory 1014 and non-volatile memory 1008, removable storage 1010 and non-removable storage 1012. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 1006, output 1004, and a communication connection 1016. Output 1004 may include a display device, such as a touchscreen, that also may serve as an input device. The input 1006 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection 1016 to connect to one or more remote computers, such as database servers, including cloud based servers and storage. The remote computer may include a personal computer (PC), server, router, network PC, a peer device or other common network node, or the like. The communication connection 1016 may include a local area network (LAN), a wide area network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 1002 of the machine 600. A hard drive, compact disk-read only memory (CD-ROM), and RAM are some examples of articles including a non-transitory computer-readable medium such as a storage device. For example, a computer program 1018 may be used to cause processing unit 1002 to perform one or more methods or algorithms described herein.

ADDITIONAL NOTES AND EXAMPLES

Example 1 includes a ground station comprising control channel receiver circuitry to receive airborne vehicle control channel packets from an airborne vehicle, control channel decode circuitry to determine contents of the airborne vehicle control channel packets, transceiver circuitry to provide uplink data to and receive downlink data from the airborne vehicle, processing circuitry, and a memory device coupled to the processing circuitry, the memory device including a program stored thereon for execution by the processing circuitry to perform operations, the operations comprising: determining, based on contents of the airborne vehicle control channel packets, that the airborne vehicle is or will be within a specified distance of the transceiver circuitry, and waking up the transceiver circuitry to receive data from or transmit data to the airborne vehicle.

In Example 2, Example 1 may further include, wherein the receiver circuitry includes an omni-directional antenna.

In Example 3, Example 2 may further include, wherein the transceiver circuitry includes a directional antenna.

In Example 4, at least one of Examples 1-3 may further include, wherein the operations further comprise: determining that the airborne vehicle is no longer within transmission range of the transceiver circuitry; and in response to determining that no airborne vehicle is within transmission range of the transceiver circuitry, putting the transceiver circuitry in a reduced power consumption mode.

In Example 5, at least one of Examples 1-4 may further include, wherein waking up the transceiver circuitry includes waking up the transceiver circuitry before the airborne vehicle is within transmission range of the transceiver circuitry.

In Example 6, Example 5 may further include, wherein the control channel packets are provided over a frequency lower than a frequency over which the transceiver circuitry operates.

In Example 7, at least one of Examples 1-6 may further include, wherein the control channel receiver circuitry operates over an automatic dependent surveillance broadcast (ADS-B) band or an aircraft communications addressing and reporting system (ACARS) band.

Example 8 is a method including receiving, at control channel receiver circuitry, airborne vehicle control channel packets from an airborne vehicle, determining, by control channel decode circuitry, contents of the airborne vehicle control channel packets, providing, by transceiver circuitry, uplink data to and receiving downlink data from the airborne vehicle, determining, based on contents of the airborne vehicle control channel packets, that the airborne vehicle is or will be within a specified distance of the transceiver circuitry, and waking up the transceiver circuitry to receive data from or transmit data to the airborne vehicle.

In Example 9, Example 8 may further include, wherein the receiver circuitry includes an omni-directional antenna.

In Example 10, Example 9 may further include, wherein the transceiver circuitry includes a directional antenna.

In Example 11, at least one of Examples 8-10 may further include determining that the airborne vehicle is no longer within transmission range of the transceiver circuitry, and in response to determining that no airborne vehicle is within transmission range of the transceiver circuitry, putting the transceiver circuitry in a reduced power consumption mode.

In Example 12, at least one of Examples 8-1 may further include, wherein waking up the transceiver circuitry includes waking up the transceiver circuitry before the airborne vehicle is within transmission range of the transceiver circuitry.

In Example 13, Example 12 may further include, wherein the control channel packets are provided over a frequency lower than a frequency over which the transceiver circuitry operates.

In Example 14, at least one of Examples 8-13 may further include, wherein the control channel receiver circuitry operates over an automatic dependent surveillance broadcast (ADS-B) band or an aircraft communications addressing and reporting system (ACARS) band.

Example 15 is a non-transitory machine-readable medium including instructions, that when executed by circuitry of a ground station, configure the ground station to perform the method of one of Examples 8-14.

Example 16 is a ground station comprising control channel receiver circuitry to receive airborne vehicle control channel packets from airborne vehicles, control channel decode circuitry to determine contents of the airborne vehicle control channel packets, transceiver circuitry to provide uplink to and receive downlink data from an airborne vehicle of the airborne vehicles, processing circuitry, and a memory device coupled to the processing circuitry, the memory device including a program stored thereon for execution by the processing circuitry to perform operations, the operations comprising determining, based on data from the receiver circuitry, a received signal strength (RSS) of a signal from each of the airborne vehicles, determining, for each of the airborne vehicles and based on decoded data from the decode circuitry, a length of time the airborne vehicle will be within transmission range of the transceiver circuitry, determining, for each of the airborne vehicles and based on the RSS or decoded data from the decode circuitry, a bit-rate of a connection between the transceiver circuitry and the airborne vehicle, determining, for each of the airborne vehicles and based on the determined RSS, determined length of time, and the determined bit-rate, an association metric, and causing, by the transceiver circuitry, ground station association with the airborne vehicle associated with the greatest association metric.

In Example 17, Example 16 further includes, wherein the decoded data from the decode circuitry includes, for each of the airborne vehicles, a bearing, a speed, a latitude, and a longitude of the airborne vehicle.

In Example 18, Example 17 further includes, wherein determining the length of time the airborne vehicle will be in transmission range of the transceiver circuitry includes determining the length of time based on the bearing, the speed, the latitude, and the longitude.

In Example 19, at least one of Examples 16-18 further includes, wherein the decoded data from the decode circuitry includes, for each of the airborne vehicles, a backhaul capacity and a current load of network traffic being served by the airborne vehicle.

In Example 20, Example 19 further includes, wherein the association metric is further determined based on a difference between the backhaul capacity and the current load of network traffic being served by the airborne vehicle.

In Example 21, at least one of Examples 16-20 further includes, wherein the association metric is further determined based on an overhead metric, the overhead metric indicates an amount of time it takes to associate with a different airborne vehicle of the airborne vehicles.

In Example 22, Example 21 further includes, wherein the overhead metric further indicates an amount of time it takes to determine beamforming parameters for transceiver circuitry communication with the airborne vehicle.

In Example 23, at least one of Examples 16-22 further includes, wherein the association metric equals the determined bit rate times the determined length of time divided by a sum of the determined length of time and a handoff overhead metric.

In Example 24, at least one of Examples 16-23 further includes, wherein the control channel receiver circuitry operates over an automatic dependent surveillance broadcast (ADS-B) band or an aircraft communications addressing and reporting system (ACARS) band.

Example 25 is a method comprising receiving, by control channel receiver circuitry, airborne vehicle control channel packets from airborne vehicles, determining, control channel decode circuitry, contents of the airborne vehicle control channel packets, providing, by transceiver circuitry, uplink to and receiving downlink data from an airborne vehicle of the airborne vehicles, determining, based on data from the receiver circuitry, a received signal strength (RSS) of a signal from each of the airborne vehicles, determining, for each of the airborne vehicles and based on decoded data from the decode circuitry, a length of time the airborne vehicle will be within transmission range of the transceiver circuitry, determining, for each of the airborne vehicles and based on the RSS or decoded data from the decode circuitry, a bit-rate of a connection between the transceiver circuitry and the airborne vehicle, determining, for each of the airborne vehicles and based on the determined RSS, determined length of time, and the determined bit-rate, an association metric, and causing, by the transceiver circuitry, ground station association with the airborne vehicle associated with the greatest association metric.

In Example 26, Example 25 further includes, wherein the decoded data from the decode circuitry includes, for each of the airborne vehicles, a bearing, a speed, a latitude, and a longitude of the airborne vehicle.

In Example 27, Example 26 further includes, wherein determining the length of time the airborne vehicle will be in transmission range of the transceiver circuitry includes determining the length of time based on the bearing, the speed, the latitude, and the longitude.

In Example 28, at least one of Examples 25-27 further includes, wherein the decoded data from the decode circuitry includes, for each of the airborne vehicles, a backhaul capacity and a current load of network traffic being served by the airborne vehicle.

In Example 29, Example 28 further includes, wherein the association metric is further determined based on a difference between the backhaul capacity and the current load of network traffic being served by the airborne vehicle.

In Example 30, at least one of Examples 25-29 further includes, wherein the association metric is further determined based on an overhead metric, the overhead metric indicates an amount of time it takes to associate with a different airborne vehicle of the airborne vehicles.

In Example 31, Example 30 further includes, wherein the overhead metric further indicates an amount of time it takes to determine beamforming parameters for transceiver circuitry communication with the airborne vehicle.

In Example 32, at least one of Examples 25-31 further includes, wherein the association metric equals the determined bit rate times the determined length of time divided by a sum of the determined length of time and a handoff overhead metric.

In Example 33, at least one of Examples 25-32 further includes, wherein the control channel receiver circuitry operates over an automatic dependent surveillance broadcast (ADS-B) band or an aircraft communications addressing and reporting system (ACARS) band.

Example 34 is a non-transitory machine-readable medium including instructions that, when executed by circuitry of a ground station, configure the ground station to perform operations of a method of one of Examples 25-33.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A ground station comprising:

control channel receiver circuitry to receive airborne vehicle control channel packets from an airborne vehicle;

control channel decode circuitry to determine contents of the airborne vehicle control channel packets;

radio circuitry to receive downlink data from the airborne vehicle;

processing circuitry; and a memory device coupled to the processing circuitry, the memory device including a program stored thereon for execution by the processing circuitry to perform operations, the operations comprising:

determining an association metric based on (a) a length of time the airborne vehicle will be within transmission range of the radio circuitry, (b) a bit-rate of a connection between the radio circuitry and the airborne vehicle, and (c) a received signal strength (RSS); and causing the ground station to associate with the airborne vehicle based on the association metric.

2. The ground station of claim 1, wherein the receiver circuitry includes an omni-directional antenna.

3. The ground station of claim 2, wherein the radio circuitry includes a directional antenna.

4. The ground station of claim 1, wherein the operations further comprise:

determining that the airborne vehicle is no longer within transmission range of the radio circuitry; and in response to determining that no airborne vehicle is within transmission range of the radio circuitry, putting the radio circuitry in a reduced power consumption mode.

5. The ground station of claim 1, wherein waking up the radio circuitry includes waking up the radio circuitry before the airborne vehicle is within transmission range of the radio circuitry.

6. The ground station of claim 5, wherein the control channel packets are provided over a frequency lower than a frequency over which the radio circuitry operates.

7. The ground station of claim 1, wherein the control channel receiver circuitry operates over an automatic dependent surveillance broadcast (ADS-B) band or an aircraft communications addressing and reporting system (ACARS) band.

8. A ground station comprising:

control channel receiver circuitry to receive airborne vehicle control channel packets from an airborne vehicle;

control channel decode circuitry to determine contents of the airborne vehicle control channel packets;

radio circuitry to receive downlink data from the airborne vehicle;

processing circuitry; and a memory device coupled to the processing circuitry, the memory device including a program stored thereon for execution by the processing circuitry to perform operations, the operations comprising:

determining an association metric based on (a) a length of time the airborne vehicle will be within transmission range of the radio circuitry, (b) a bit-rate of a connection between the radio circuitry and the airborne vehicle, and (c) a received signal strength (RSS); and causing the ground station to associate with the airborne vehicle based on the association metric.

9. The ground station of claim 8, wherein determining which airborne vehicle of the airborne vehicles with which to associate includes:

determining, based on data from the receiver circuitry, the RSS of a signal from the airborne vehicle;

determining, for the airborne vehicle and based on decoded data from the decode circuitry, the length of time the airborne vehicle will be within transmission range of the radio circuitry;

determining, for the airborne vehicle and based on the RSS or decoded data from the decode circuitry, the bit-rate of a connection between the radio circuitry and the airborne vehicle;

determining, for the airborne vehicle and based on the determined RSS, determined length of time, and the determined bit-rate, the association metric; and causing, by the radio circuitry, ground station association with the airborne vehicle associated with the greatest association metric.

10. The ground station of claim 9, wherein the decoded data from the decode circuitry includes, for the airborne vehicle, a bearing, a speed, a latitude, and a longitude of the airborne vehicle.

11. The ground station of claim 10, wherein determining the length of time the airborne vehicle will be in transmission range of the radio circuitry includes determining the length of time based on the bearing, the speed, the latitude, and the longitude.

12. The ground station of claim 9, wherein the determined data from the decode circuitry includes, for the airborne vehicle, a backhaul capacity and a current load of network traffic being served by the airborne vehicle.

13. The ground station of claim 12, wherein the association metric is further determined based on a difference between the backhaul capacity and the current load of network traffic being served by the airborne vehicle.

14. The ground station of claim 9, wherein the association metric is further determined based on an overhead metric, the overhead metric indicates an amount of time it takes to associate with a different airborne vehicle.

15. The ground station of claim 14, wherein the overhead metric further indicates an amount of time it takes to determine beamforming parameters for radio circuitry communication with the airborne vehicle.

16. The ground station of claim 9, wherein the association metric equals the determined bit rate times the determined length of time divided by a sum of the determined length of time and a handoff overhead metric.

17. The ground station of claim 8, wherein the control channel receiver circuitry operates over an automatic dependent surveillance broadcast (ADS-B) band or an aircraft communications addressing and reporting system (ACARS) band.

18. A non-transitory machine-readable medium including instructions that, when executed by circuitry of a ground station, configure the ground station to perform operations for determining an airborne vehicle with which to associate the operations comprising:

determining an association metric based on (a) a length of time the airborne vehicle will be within transmission range of the radio circuitry of the ground station, (b) a bit-rate of a connection between the radio circuitry and the airborne vehicle, and (c) a received signal strength (RSS); and causing the ground station to associate with the airborne vehicle based on the association metric.

19. The non-transitory machine-readable medium of claim 18, wherein the operations further comprise receiving control channel packets from the airborne vehicle, wherein the contents of the airborne vehicle control channel packets include a bearing, a speed, a latitude, and a longitude of the airborne vehicle.

20. The non-transitory machine-readable medium of claim 19, wherein the contents of the airborne vehicle control channel packets further include a backhaul capacity and a current load of network traffic being served by the airborne vehicle.

* * * * *